(12) United States Patent
Sattler et al.

(10) Patent No.: US 7,783,522 B2
(45) Date of Patent: Aug. 24, 2010

(54) METHOD AND SYSTEM FOR HIERARCHY-BASED PARTNER SELECTION

(75) Inventors: Wolfgang Sattler, Kirkel (DE); Joachim Hartmann, St. Ingbert (DE)

(73) Assignee: SAP AG, Walldorf (DE)

( * ) Notice: Subject to any disclaimer, the term of this patent is extended or adjusted under 35 U.S.C. 154(b) by 1145 days.

(21) Appl. No.: 11/176,190

(22) Filed: Jul. 8, 2005

(65) Prior Publication Data

US 2007/0011054 A1 Jan. 11, 2007

(51) Int. Cl.
*G06Q 30/00* (2006.01)
(52) U.S. Cl. ........................................... 705/26
(58) Field of Classification Search .................. 705/26, 705/27
See application file for complete search history.

(56) References Cited

U.S. PATENT DOCUMENTS

| | | | |
|---|---|---|---|
| 5,970,475 A * | 10/1999 | Barnes et al. | 705/27 |
| 2002/0062240 A1* | 5/2002 | Morinville | 705/8 |
| 2003/0061216 A1* | 3/2003 | Moses | 707/9 |
| 2006/0074806 A1* | 4/2006 | McKegney et al. | 705/51 |

* cited by examiner

*Primary Examiner*—Amee A Shah
(74) *Attorney, Agent, or Firm*—Kenyon & Kenyon LLP

(57) ABSTRACT

The disclosure relates to an automated method for product ordering and other operations via the Internet, while acting as a substitute or surrogate for another entity. According to the method, a user may connect to a web site and request a list of entities (also, "partners") for which the user is authorized to place orders or perform other operations. Nodes of a hierarchical data structure may be used to represent the entities and the user. The hierarchical data structure may be processed to determine which of the nodes the user is authorized to perform operations for. The instructions may return a list of eligible nodes to the user, filtering out ineligible nodes.

10 Claims, 4 Drawing Sheets

100

METHOD AND SYSTEM FOR HIERARCHY-BASED PARTNER SELECTION

BACKGROUND OF THE INVENTION

Given the availability of the Internet, businesses have taken to using "e-commerce" to perform the transactions needed for carrying on their affairs. "Web shops" are known that allow business employees to sign on and navigate through various transactions in support of the business. For example, a user may log on to a computer connected to the Internet, link to a web site that offers e-commerce, and place product orders from commercial manufacturers and distributors via the web site.

Commercial manufacturers and distributors (collectively, "vendors") commonly accept product orders via electronic systems. Business enterprises can be complex, sprawling arrangements, comprising many entities that may be dispersed across countries and continents. E-commerce may be useful to such enterprises in particular, for example, by allowing certain of the entities to act on behalf of others of the entities when placing orders. However, when business enterprises having a complex structure use e-commerce, it can be important to have controls in place. In particular, entities should only be able to perform e-commerce on behalf of other entities when they are authorized to do so.

For large retail accounts, for example, clients may dictate to vendors discrete ways in which client personnel may place orders to the vendors. For example, the client may specify that certain of its employees have authority to order products but others do not. The client may specify that certain employee have authority to order products only for specified entities within the clients corporate landscape (e.g., for a single retail store in the organization or for stores within a discretely identified certain corporate district or region). If an employee places a product order that amounts to a violation of his authority, the client will not accept responsibility for the order.

Accordingly, there is a need in the art for an electronic retailing system that can identify which agents within a third-party client organization are entitled to place orders with the system and which are not. Further, there is a need for such a system that can identify, for which entities within a large, multi-entity organization, an agent is entitled to place orders.

DETAILED DESCRIPTION

Embodiments of the present invention relate to an automated method for product ordering and other operations via the Internet, while acting as a substitute or surrogate for another entity. The method may include the execution of computer instructions that refer to a hierarchical data structure representing a business organization. According to the method, a user may connect to a web site and request a list of entities (also, "partners") for which the user is authorized to place orders. Nodes of the hierarchical structure may be used to represent the entities and the user. The computer instructions may read the hierarchical data structure to determine which of the nodes the user is authorized to perform operations for. The instructions may return a list of eligible nodes to the user, filtering out ineligible nodes. The user may select a node from the list presented and proceed to perform operations such as product ordering on the web site, in effect acting as a surrogate for the selected node. By processing the hierarchical data structure as described, the instructions may reduce complexity for the user and provide controls on the web commerce.

Figure 1:
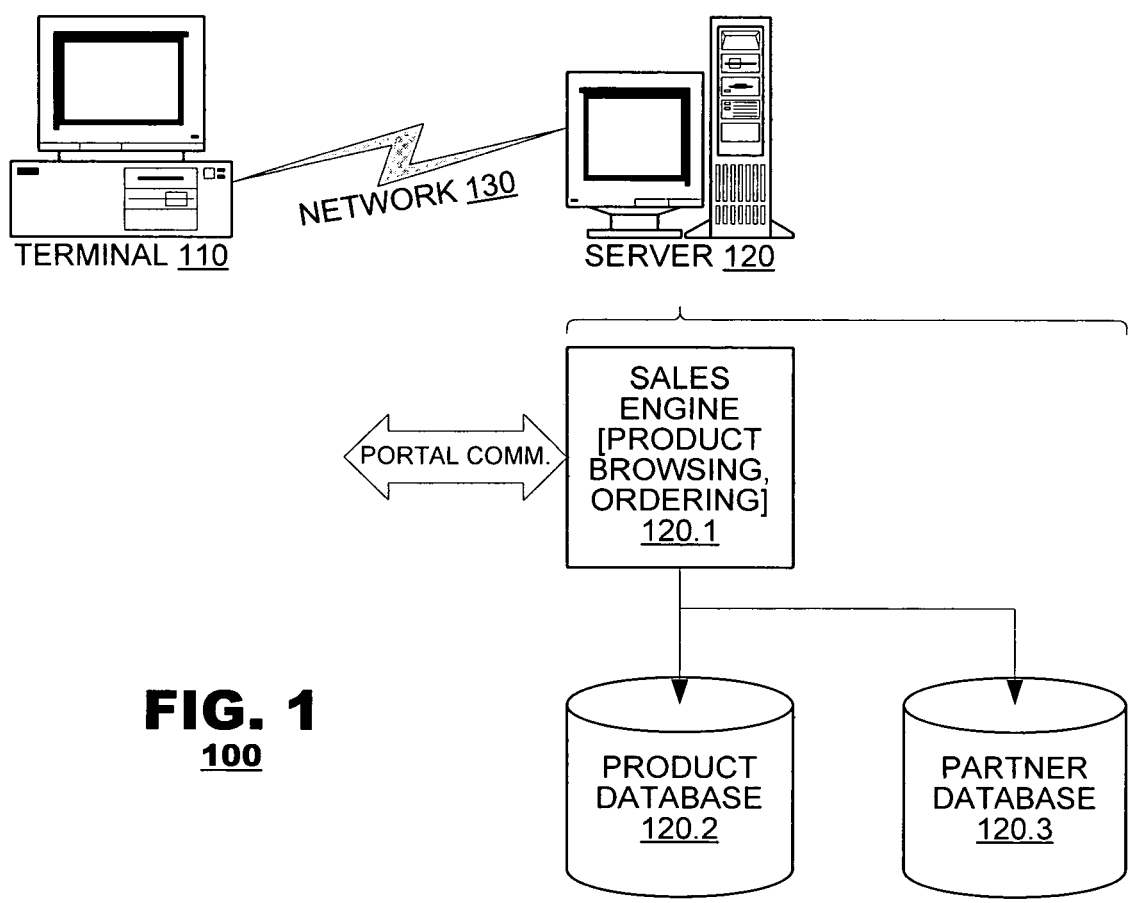
FIG. 1 shows an electronic ordering system according to embodiments of the present invention.

Referring to FIG. 1, embodiments of the present invention may comprise a terminal 110 coupled via a network 130 to a server 120. Through portal communications functionality, a user at the terminal 110 may interact with a sales engine 120.1 of the server, to perform such operations as product browsing, ordering and the like. The sales engine 120.1 may comprise computer instructions. In interacting with the user, the sales engine 120.1 may refer to a product database 120.2 and a partner database 120.3. For example, the sales engine 120.1 may read information from the product database 120.2 and partner database 120.3, and send corresponding screen displays to the terminal 110 in response to user inputs. The product database 120.2 and partner database 120.3 may be stored on a machine-readable medium such as disk.

Figure 2:
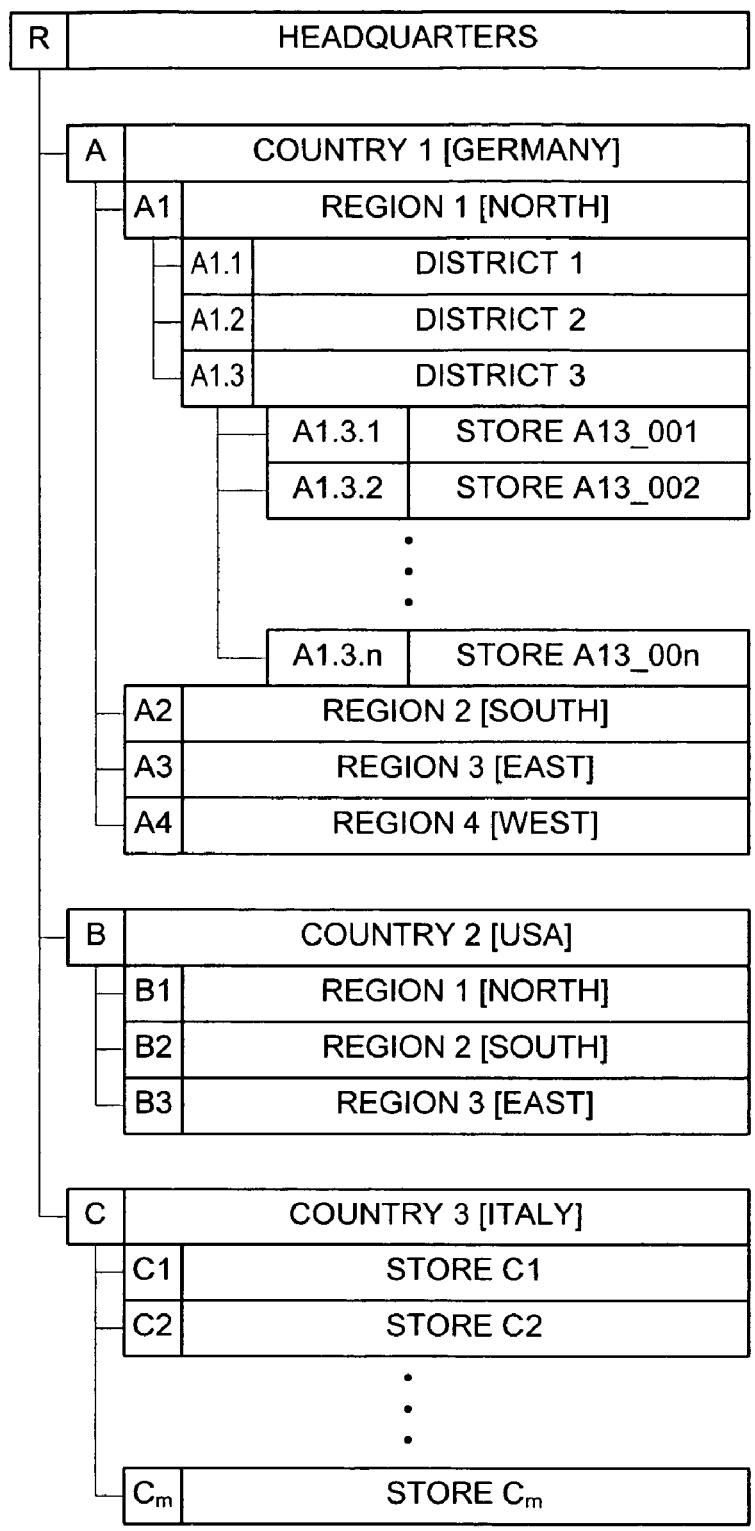
FIG. 2 illustrates an example of a hierarchical data structure according to embodiments of the present invention.

In particular, the sales engine may consult a partner hierarchy to determine those partners for which the user has permission to perform given operations. FIG. 2 shows an example of a partner hierarchy 200. The hierarchy 200 may comprise a plurality of nodes hierarchically arranged. For example, the hierarchy may include "parent" nodes, and "child" nodes subordinate to or at a lower level than the parent nodes. In FIG. 2, an R node is the highest-level parent node. Nodes A, B and C are child nodes of the R node. Each of nodes A, B and C, in turn, is a parent node with respective child nodes. Nodes A1, A2, A3 and A4 are child nodes of node A. Nodes B1, B2 and B3 are child nodes of node B. Nodes C1, C2 . . . , Cm are child nodes of node C. Node A1 is in turn a parent node with child nodes A1.1, A1.2, and A1.3. Node A.1.3 is also a parent node with child nodes A1.3.1, A1.3.2, . . . , A1.3.n.

In the example of FIG. 2, the hierarchy corresponds to a business enterprise, such as a chain of stores distributed throughout countries and regions and their associated governing headquarters. The highest-level node R represents a main or corporate headquarters of the enterprise. Nodes A, B and C represent national headquarters in respective countries. Each national headquarters may oversee, for example, regional headquarters represented by nodes such as A1-A4, B1-B3, and so on. Regions may be divided into districts as represented by nodes A1.1-A1.3, for example. Finally, at a lowest level, within respective districts there may be the stores themselves as represented by nodes A1.3.1-A1.3.n.

FIG. 2 shows a fairly simple configuration. Hierarchical organizations could be significantly larger and more complex. Accordingly, embodiments of the present invention relate to computer-executable instructions to consult a hierarchy as shown in FIG. 2 and filter nodes of the hierarchy based on their position within the hierarchy. The filtering reduces complexity for a user and provides controls on web commerce.

A user may be, for example, an employee at a location corresponding to one of the nodes of the hierarchy. Nodes for which a user is permitted to perform operations will be filtered through for presentation to the user. Nodes for which the user is not permitted to perform operations will be filtered out (not presented). The user may select a node from the list of nodes presented and perform operations for the selected node.

More specifically, nodes may be filtered through when they are lower in the hierarchy than the node corresponding to the user, and filtered out when they are at the same level or higher in the hierarchy than the node corresponding to the user. Thus, referring again to the example of FIG. 2, if the user corresponded to, say, node A, nodes A1-A4, A1.1-A1.3 and nodes A1.3.1-A1.3.n would be filtered through for presentation to the user, while the rest would be filtered out (not presented). Similarly, if the user corresponded to, say, node B, nodes B1-B3 would be filtered through while the rest would be filtered out.

Figure 3:
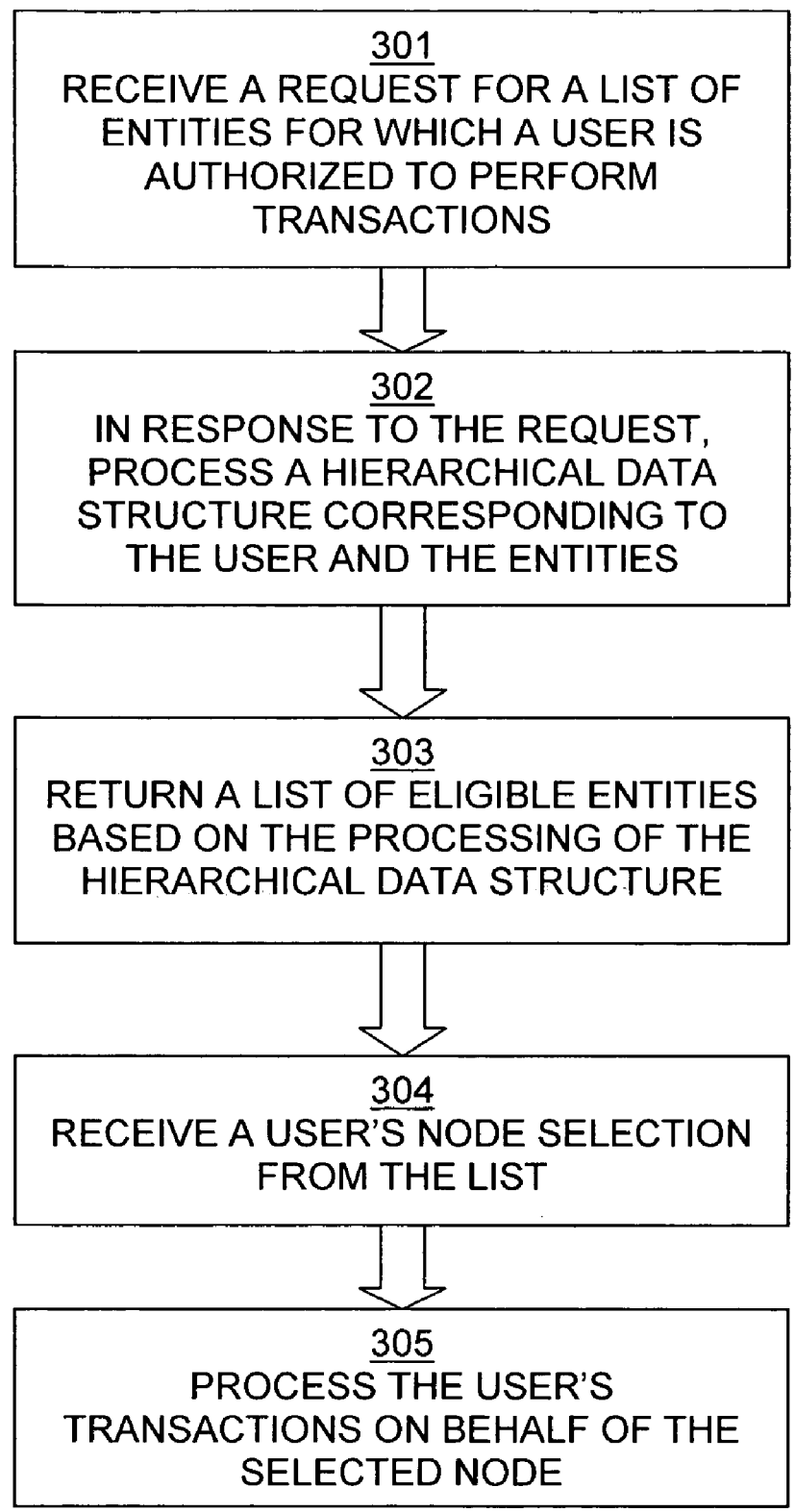
FIGS. 3 and 4 show process flows according to embodiments of the present invention.

FIG. 3 shows a flowchart of operations according to embodiments of the present invention. As shown in block 301, a web shop may receive a request from a user connected via the Internet for a list of nodes for which the user is authorized to perform web shop transactions. In response to the request, computer instructions at a server, e.g. a sales engine 120.1 on a server 120, may be invoked. As shown in block 302, the instructions may read, retrieve, consult, refer to, or otherwise process a hierarchical data structure stored on a machine-readable medium, for example in a partner database 120.3. The hierarchical data structure may comprise a plurality of nodes hierarchically arranged, where respective nodes correspond to the user and the entities.

After processing the hierarchical data structure, the instructions may return a list of eligible nodes to the user, as shown in block 303. A user's selection of a node from the list may then be received, as shown in block 304. For a selected node, the user may act as a surrogate, placing orders and performing other web shop operations on behalf of the selected node. The web shop may process the orders and other operations on behalf of the selected node, as shown in block 305.

Figure 4:
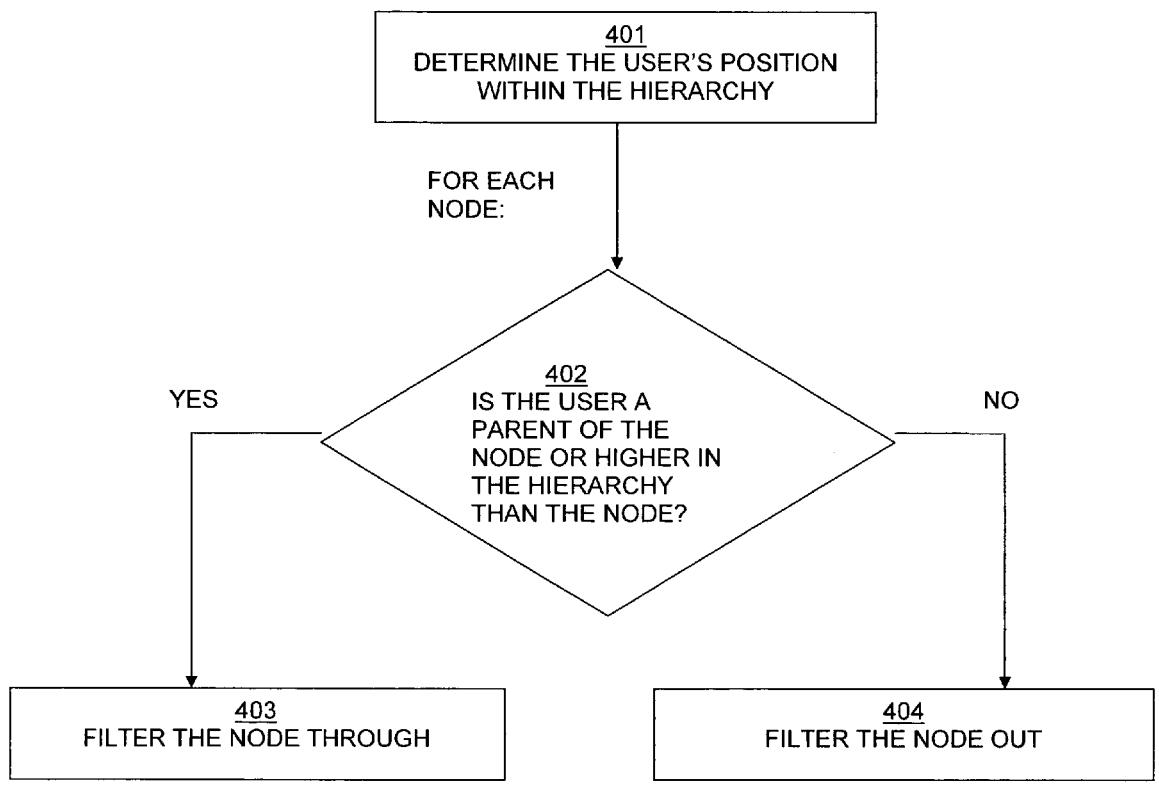

FIG. 4 shows logic for processing the hierarchy in greater detail (i.e., the logic corresponding to blocks 302-303 of FIG. 3). To filter through those nodes for which the user is permitted to perform operations while filtering out others, the instructions may determine where the user belongs in the hierarchy, as shown in block 401. This may be done, for example, based on an identifier assigned to the user.

After the user's position in the hierarchy is determined, the rest of the nodes in the hierarchy may be compared with the user's node, as shown in block 402. If a given node is a child node of the user node, either directly or indirectly through an intermediate child node, it will be filtered through 403. If not, the node will be filtered out 404.

In processing the hierarchy, the system may identify all nodes to which a business partner is assigned, identify nodes that are direct or indirect child nodes from the partner's assigned nodes and, thereafter, read partners which are assigned to the identified child nodes.

A computer program or collection of programs comprising computer-executable instructions according to embodiments of the present invention may be stored on a machine-readable medium such as disk (e.g., "hard" or "fixed" disk). Other machine-readable media that the instructions may be stored on include "floppy" disk, CD-ROM, and magnetic tape. The computer-executable instructions may be retrieved from the machine-readable media using a suitable reading device into a memory and executed by a processor. The computer-executable instructions may be distributed across a plurality of media, such as on physically separate storage devices respectively associated with physically separate computer systems that may communicate via a network. The functionality disclosed hereinabove may find specific implementations in a variety of forms, which are considered to be within the abilities of those of ordinary skill in the pertinent art after having reviewed the specification.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. An on-line shopping method, comprising:
accessing by a transacting partner user, via a sales engine executing on a processor, a product catalog of a shopping system;
accessing, via the sales engine, a partner database storing data in a hierarchical node/tree structure identifying a plurality of partners, which are business entities, entitled to use a shopping system, wherein a transacting partner at a first node position in a hierarchy is entitled to place orders on behalf of partners at nodes that are child nodes to the first node;
identifying, to the transacting partner user by the sales engine, which other partners from the plurality of partners on whose behalf the transacting partner user is entitled to place orders based on an analysis of the partner database by the sales engine wherein a transacting partner's entitlement to order on behalf of other partners is based on the transacting partners position in the hierarchical node/tree structure of the partner database; and
authenticating a transacting partner user's entitlement to order from a product catalog on a shopping system based on the results of the identifying.

2. The on-line shopping method of claim 1, further comprising:
supporting product browsing of the product database and ordering by the transacting partner user; and
throughout the product browsing and ordering, displaying only the identified set of partners to the transacting partner user as transacting entities.

3. The on-line shopping method of claim 1, wherein the hierarchical node/tree structure of the partner database comprises a plurality of nodes related to the relative position of the plurality of partners; and wherein the analysis of the partner database comprises:
accessing, by the sales engine, the hierarchical node/tree structure of the partner database, and filtering nodes of the hierarchical node/tree structure of the partner database using the position of the transacting partner in the hierarchical node/tree structure with respect to the plurality of partners as a filtering condition.

4. An on line shopping system, comprising:
a sales engine executing on a processor, the processor configured to operate according to program instructions for placing orders on behalf of a transacting partner, wherein the transacting partner is a business entity,
a product database storing a product catalog of the shopping system accessible by the sales engine,
a partner database, accessible by the sales engine, storing data in a hierarchical node-tree structure identifying a plurality of partners, which are business entities, entitled to use the shopping system wherein the transacting partner is a business entity, and a transacting partner at a first node position in a hierarchy is entitled to place orders on behalf of partners at nodes that are child nodes to the first node;

wherein the processor is further configured to:
identify to the transacting partner which other partners from the plurality of partners on whose behalf the transacting partner are entitled to place orders, wherein a transacting partner's entitlement to order on behalf of other partners is based on the transacting partners position in the hierarchical node/tree structure of the partner database,
authenticate a customer as a surrogate for the transacting partner by accessing the hierarchical node/tree structure of the partner database,
support product browsing of the product database and ordering by the authenticated customer for the identified partners, and
throughout the product browsing and ordering, display only the identified partners to the customer as transacting entities.

5. The shopping system of claim 1, further comprising a communication manager to support communications between the sales engine and an external terminal.

6. An on line shopping system, comprising:
a sales engine executing on a processor, the processor operating according to program instructions to place orders on behalf of a transacting partner, wherein the transacting partner is a business entity, the sales engine configured to authenticate and grant access to a transacting partner user;
a product database storing a product catalog of the shopping system accessible by the sales engine,
a partner database, accessible by the sales engine, storing data in a hierarchical node/tree structure identifying a plurality of partners, which are business entities, entitled to use the shopping system wherein a partner at a first node position in a hierarchy is entitled to place orders on behalf of partners at nodes that are child nodes to the first node;
wherein the processor is further configured to:
identify to the transacting partner user, which other partners from the plurality of partners on whose behalf the transacting partner user is entitled to place orders, based on an analysis of the partner database wherein a transacting partner's entitlement to order on behalf of other partners is based on the transacting partners position in a hierarchical node/tree structure of the partner database.

7. The shopping system of claim 6, further comprising a communication manager to support communications between the sales engine and an external terminal.

8. A machine-readable storage medium for storing instructions to cause a processor to perform an on-line shopping method, the method comprising the steps of:
accessing by a transacting partner user, via a sales engine executing on a processor, a product catalog of a shopping system;
accessing, via the sales engine, a partner database storing data in a hierarchical node/tree structure identifying a plurality of partners, which are business entities, entitled to use a shopping system, wherein a transacting partner at a first node position in a hierarchy is entitled to place orders on behalf of partners at nodes that are child nodes to the first node;
identifying, to the transacting partner user by the sales engine, which other partners from the plurality of partners on whose behalf the transacting partner user is entitled to place orders based on an analysis of the partner database by the sales engine wherein a transacting partner's entitlement to order on behalf of other partners is based on the transacting partners position in the hierarchical node/tree structure of the partner database; and
authenticating a transacting partner user's entitlement to order from a product catalog on a shopping system based on the results of the identifying.

9. The machine-readable storage medium of claim 8 for storing instructions to cause a processor to perform an on line shopping method, further comprising the steps of:
support product browsing of the product database and ordering by the transacting partner user for partners for whom the transacting partner user is permitted to place orders; and
throughout the product browsing and ordering, displaying only the identified set of partners to the transacting partner user as transacting entities.

10. The machine-readable storage medium of claim 8, wherein the hierarchical node/tree structure of the partner database comprises a plurality of nodes related to the relative position of the plurality of partners; and wherein the analysis of the partner database comprises:
accessing, by the sales engine, the hierarchical node/tree structure of the partner database, and filtering nodes of the hierarchical node/tree structure of the partner database using the position of the transacting partner in the hierarchical node/tree structure with respect to the plurality of partners as a filtering condition.

* * * * *